United States Patent
Shinn (10) Patent No.: US 9,311,581 B2
(45) Date of Patent: Apr. 12, 2016

(54) SYSTEM AND METHOD FOR TRACKING THE FULFILLMENT STATUS OF REQUIREMENTS FOR COMPLETING AN OBJECTIVE

(76) Inventor: Daniel W. Shinn, Kansas City, MO (US)

(*) Notice: Subject to any disclaimer, the term of this patent is extended or adjusted under 35 U.S.C. 154(b) by 1266 days.

(21) Appl. No.: 11/975,663

(22) Filed: Oct. 19, 2007

(65) Prior Publication Data

US 2009/0106641 A1 Apr. 23, 2009

(51) Int. Cl.

| | |
|---|---|
| *G06F 17/00* | (2006.01) |
| *G06K 17/00* | (2006.01) |
| *G06Q 10/10* | (2012.01) |
| *G06Q 40/02* | (2012.01) |
| *G06Q 50/16* | (2012.01) |

(Continued)

(52) U.S. Cl.
CPC ............ *G06K 17/0032* (2013.01); *G06F 17/24* (2013.01); *G06F 17/243* (2013.01); *G06Q 10/101* (2013.01); *G06Q 40/025* (2013.01); *G06Q 50/16* (2013.01); *G07C 13/00* (2013.01); *G09B 7/00* (2013.01); *G09B 7/02* (2013.01); *H04N 1/00326* (2013.01); *H04N 1/00331* (2013.01); *H04N 1/00334* (2013.01); *H04N 1/00366* (2013.01); *H04N 1/00371* (2013.01); *H04N 1/00376* (2013.01); *H04N 1/00379* (2013.01); *G06K 2017/0045* (2013.01); *G06Q 30/02* (2013.01)

(58) Field of Classification Search
CPC .................. G06K 17/0032; G06K 2017/0045; G06Q 10/101; G06Q 40/025; G06Q 50/16; G06F 17/243; G06F 17/24; H04N 1/00326; H04N 1/00331; H04N 1/00334; H04N 1/00366; H04N 1/00371; H04N 1/00376; H04N 1/00379; G07C 13/00; G09B 3/00; G09B 7/00; G09B 7/02

See application file for complete search history.

(56) References Cited

U.S. PATENT DOCUMENTS

| | | |
|---|---|---|
| 4,430,563 A | 2/1984 | Harrington |
| 4,857,715 A | 8/1989 | Koch et al. |

(Continued)

OTHER PUBLICATIONS

Pearson Phoenix Products—Pupil Attendance Register; http://www.pearsonphoenix.com/products/product.php?id=24&mt=scot, 2003, 2 pages.

(Continued)

*Primary Examiner* — Nathan Hillery
(74) *Attorney, Agent, or Firm* — Mark C. Young; Erickson Kernell Derusseau & Kleypas, LLC (57) ABSTRACT

The present invention is directed to a system and method for entering into a computer in an automated manner the fulfillment status of requirements for completing an objective, such as an award offered by an organization. A computer-readable form includes a form identifier and a separate set of response fields for each person whose requirement fulfillment status is contained on the form, with the response fields adapted to receive a scanably detectable mark indicating completion of a requirement. The form can further include an indicator of each requirement for the objective and a name or identifier for each person seeking to complete the objective. A completion schema may be employed to determine whether a person had completed the objective. The invention enables the completion status of an award or other objective to be entered into a computer without typing and thereby saves personnel time, improves recordkeeping, and better facilitates reporting.

10 Claims, 4 Drawing Sheets

(51) Int. Cl.

| | | |
|---|---|---|
| *G06F 17/24* | (2006.01) | |
| *H04N 1/00* | (2006.01) | |
| *G07C 13/00* | (2006.01) | |
| *G09B 7/00* | (2006.01) | |
| *G09B 7/02* | (2006.01) | |
| *G06Q 30/02* | (2012.01) | |

(56) References Cited

U.S. PATENT DOCUMENTS

| | | | |
|---|---|---|---|
| 4,937,439 A | 6/1990 | Wanninger et al. | |
| 5,184,003 A | 2/1993 | McMillin et al. | |
| 5,734,838 A | 3/1998 | Robinson et al. | |
| 6,289,348 B1 | 9/2001 | Richard et al. | |
| 6,918,772 B2 | 7/2005 | Clark et al. | |
| 6,996,365 B2 | 2/2006 | Okubo | |
| 7,169,050 B1 | 1/2007 | Tyler | |
| 2003/0140306 A1 | 7/2003 | Robinson | |
| 2003/0173404 A1* | 9/2003 | Chung et al. | 235/386 |
| 2004/0103366 A1* | 5/2004 | Peyton-Jones et al. | 715/503 |
| 2004/0216039 A1* | 10/2004 | Lane et al. | 715/511 |
| 2005/0226541 A1* | 10/2005 | McIntosh et al. | 382/306 |
| 2005/0237580 A1* | 10/2005 | Coleman et al. | 358/462 |
| 2006/0003306 A1* | 1/2006 | McGinley et al. | 434/350 |
| 2006/0277141 A1* | 12/2006 | Palmer | 705/38 |
| 2008/0015959 A1* | 1/2008 | Kruglikov et al. | 705/28 |
| 2008/0112564 A1* | 5/2008 | Vanderstraeten | 380/243 |
| 2008/0164305 A1* | 7/2008 | Ball | 235/375 |
| 2008/0235263 A1* | 9/2008 | Riaz et al. | 707/102 |
| 2008/0264701 A1* | 10/2008 | Radtke et al. | 178/19.01 |

OTHER PUBLICATIONS

Chancery Student Management Solutions; http://www.scantron.com/downloads/forms/Chancery.pdf., 2002, 12 pages.

Kevin Orchard, The Use of Optical Mark Reading (OMR) for Census Data Collection,18th Population Census Conference: Aug. 26-29, 1998, Program on Population, East-West Center, Honolulu, Hawaii, Aug. 1998, 11 pages.

\* cited by examiner

Fig. 1

| Camp Name | | | | | | | | | | | | | | | | | | | | | | | | | | | | | | | Page 1 of 1 | |
|---|---|---|---|---|---|---|---|---|---|---|---|---|---|---|---|---|---|---|---|---|---|---|---|---|---|---|---|---|---|---|---|---|
| 2007-ABC-DE3-CitW-4-1-1 | | | | | | | | | | | | | | | | | | | | | | | | | | | | | | | | |
| | | | | Class Completion Record | | | | | | | | | | | | | | | | | | | | | | | | | | | | |
| | | | | Citizenship-World MB (3741) | | | | | | | | | | | | | | | | | | | | | | | | | | | | |
| | | | | (sec. 4, begins 7/7/07 8am) | | | | | | | | | | | | | | | | | | | | | | | | | | | | |
| | | | | | | | | | | | | | | | | | | | | | | | | | | | | | | | | |
| | | | | | | | | | | | | | Instructor (print): ______ | | | | | | | | | | | | | | | | | | | |
| Name | Troop | 1a | 1b | 2a | 2b | 3a | 3b | 4a | 4b | 5a | b1 | b2 | b3 | b4 | b5 | b6 | b7 | 6a | 6b | 6c | 7a | 7b | 7c | 8a | 8b | 9a | 9b | 9c | 9d | 9e | 9f | Counselor Initials |
| | | | | 3: do 1 | | | | | | | 5b: do 2 | | | | | | | | | | | | | | | | 9: do 1 | | | | | |
| 1. Doe01, John | 1234 | O | O | O | O | O | O | O | O | O | O | O | O | O | O | O | O | O | O | O | O | O | O | O | O | O | O | O | O | O | O | ☐ |
| 2. Doe02, John | 1234 | O | O | O | O | O | O | O | O | O | O | O | O | O | O | O | O | O | O | O | O | O | O | O | O | O | O | O | O | O | O | ☐ |
| 3. Doe03, John | 1234 | O | O | O | O | O | O | O | O | O | O | O | O | O | O | O | O | O | O | O | O | O | O | O | O | O | O | O | O | O | O | ☐ |

SYSTEM AND METHOD FOR TRACKING THE FULFILLMENT STATUS OF REQUIREMENTS FOR COMPLETING AN OBJECTIVE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates to computer data entry and, more particularly, to a method for using a computer-readable form to enter into a computer the fulfillment status of individual requirements for completing an objective.

2. Description of Related Art

Many organizations set forth objectives achievable by completing a set of requirements. The objective may be an award that a member of the organization wishes to earn. Youth organizations in particular offer their members a wide variety of awards and other objectives to obtain recognition. For example, the Boy Scouts of America organization allows a youth member, such as a Boy Scout, to earn merit badges and similar awards by completing predefined requirements for the respective award.

Objectives can have many requirements. Some awards in the Boy Scout program, for example, have 10 or more separate requirements that a Scout must complete to earn the award. And some requirements may be fulfilled by completing a specified number of alternative steps. For example, completion of a requirement may require the participant to complete 4 of 7 specified steps, thereby increasing the potential complexity in tracking requirement fulfillment status.

In the Boy Scout context, a Scout typically works with a counselor, or a designee under the counselor's direction, to assist the Scout in fulfilling the requirements. Records of a Scout's progress toward fulfillment of the various requirements for the award are normally maintained on paper. For example, a merit badge card is a standard form on which a counselor may record by hand all requirements for the merit badge award and indicate those fulfilled by the Scout as he progresses. Upon completion of the requirements, the counselor signs the card indicating that the Scout has completed the award and returns the card to the Scout, who gives the card to an adult leader in charge of awards so that the award may later be presented to the Scout.

This manual system for recording the fulfillment of each requirement can become burdensome for the counselor or a designee when working with a large group of Scouts. For example, Scouts typically can attend a summer camp or other event and earn merit badges or similar awards. These awards may be taught in classes in which numerous Scouts participate over one or more days, and a Scout frequently is able to fulfill all requirements for, and thereby complete, the award during this time.

The counselors in many such settings maintain paper records of each participant's fulfillment of the applicable requirements. On the first day of class, the counselor may create a class roster form on paper by asking each Scout for his name and handwriting the name on the form, usually in the order received. The requirements for an objective or award are usually numbered, and the counselor often handwrites the numbers corresponding to the award requirement atop columns of check-mark boxes or similar constructs displayed on the roster form. Counselors may also receive another form from each Scout, such as a merit badge card signed by an adult leader, signifying approval to enroll in the class. The counselor collects these cards on the first day of class, handwrites progress information on them and returns them to the Scout at the end of the class, camp, or event. The card can thereby serve as a record for the Scout, confirming his completion, or partial completion, of the award.

During or after each class session, the counselor may place an "X" or other handwritten mark in the designated check-mark box or similar construct on the roster form signifying that a Scout has completed the respective requirement. In some instances, a counselor must also maintain a separate, nearly identical set of roster forms or similar records by hand so that scout leaders may review these records over the course of the class and thereby monitor the progress of Scouts under their supervision toward completing the award. Despite best efforts, discrepancies between the counselor's class records and the copy thereof can arise, since both are maintained by hand. If the discrepancy is not timely corrected, the Scout may rely on an inaccurate statement of his progress and possibly have to fulfill an incorrectly marked requirement after the class has ended, which can be discouraging and time-consuming. Even if discrepancies are discovered, resolving them and the resulting questions from scout leaders can be time-consuming for the staff members.

At the end of the camp or event, a virtual avalanche of paperwork can descend upon the staff. Thousands of awards may have been fully completed, and hundreds more only partially completed. The roster form from each class is finalized by hand, marked to indicate whether each Scout has completed, or has not completed, the award, and usually retained for the permanent records of the camp or event. To provide the Scout with a record of partial or full completion, the counselors often must manually fill out a separate card or other record for each of the many awards sought, manually indicating on each card each separate requirement that the Scout fulfilled. The cards are then manually sorted for distribution to the respective Scout's unit. These many manual processes are time-consuming and can become an undesirable aspect of serving on a camp or event staff. Moreover, with so many individual cards to manage, cards can be missorted or otherwise become lost, necessitating time-consuming review of other paper records to re-construct the completion status of the awards corresponding to the missing cards.

To partially relieve a camp or event staff from this paperwork burden, a computerized solution could be employed. Under this approach, each Scout could register for a class by manually entering class participant data, such as event designation, name and class selection, into a computer before the initial class and storing the resulting selections on a computer medium, such as a diskette. The camp or event staff could obtain this data, for example from the diskette, and generate class roster forms ready for use on the initial day of class. Requirement fulfillment data could be entered into the computer by hand from the class roster forms, and the computer could generate reports concerning awards.

This computerized approach to managing award completion status may somewhat lessen the paperwork burden on the staff at a large camp or event, but it can introduce new problems. Camp or event participants may collectively work on thousands of awards. Hand entry of such a large amount of completion data could require the camp or event to provide computers for use by the staff. Furnishing an outdoor camp or event with a sufficient number of networked computers to avoid bottlenecks during data entry could be costly and present logistical issues. In addition, data entry errors can occur when manually transferring the data from the handwritten class roster to the computer and thereby degrade the reliability of the computerized information. Furthermore, a guiding principle of many outdoor camps and events is to provide participants and staff alike with an outdoor experience. Requiring the staff to spend time outside of class at a computer keyboard manually entering award completion data could unacceptably conflict with this principle and also reduce the time the staff might better spend assisting camp or event participants. Moreover, due to staff members' busy schedules, this time-consuming, manual task could become a low priority and thus performed infrequently. As a result, formal updates to scout leaders and camp staff managers alike concerning the status of award completions could become so infrequent as to prompt numerous ad hoc inquiries for interim updates, requiring the staff to spend time responding thereto.

Accordingly, there is a need for a low-cost, time-saving and accurate solution for entering into a computer the fulfillment status of the requirements for an objective, such as an award, particularly for awards and other objectives being completed during an outdoor activity. There is also a need for a data entry solution that does not conspicuously display computer technology to the participants seeking the objective, but nevertheless allows automated collection of completion data in electronic form for importing into a computer database. In addition, a need exists for initially collecting this data on media resistant to data loss caused by inclement weather during an outdoor camp or event.

BRIEF SUMMARY OF THE INVENTION

The present invention addresses the above-referenced limitations by providing a method for entering into a computer in an automated manner the fulfillment status of requirements for completing an objective. The method uses a pre-printed paper form that contains a form identifier and a separate set of response fields for each person whose requirement fulfillment status is contained on the form.

A response field is identified by a lightly colored shape outline, such as a circle, printed on the form. Response fields are grouped into a row evenly spaced horizontally across the form. Multiple rows of response fields can be aligned with one another to form a grid of rows and columns on the form. A separate row of response fields on the form is associated with each person seeking to complete the objective.

The requirements for completing an award or other objective are defined by the sponsoring organization, which typically makes the requirements publicly available. The requirements will often be numerically identified, such as 1, 2, 3a, 3b, 3c, 4, etc. These requirement identifiers or other indicators are placed on the form as column headers atop the columns of response fields to identify the response field in each row of response fields containing the fulfillment status for the requirement signified by the respective column header. These identified response fields thus define a set of response fields within each row of response fields that contain information about the corresponding person's fulfillment or completion status, thereby distinguishing the response fields in the set from other response fields in the row that, for a given objective, may remain unused.

The name or other participant identifier can be supplied on the form adjacent a corresponding set of response fields containing the fulfillment status of the requirements by that person. The form further contains a computer-readable form identifier, such as an alphanumeric string, to enable the computer to identify each form.

The method of the present invention is implemented using the computer-readable form described above and a computer with an attached electronic scanner capable of scanning the form. Before an event at which persons will seek to complete an award or other objective, a computer-readable form for the specific event is prepared containing the form identifier, the names of participants, and the requirement indicators atop the columns of response fields. During the event, the instructor periodically marks response fields in a person's set of response fields on the form to signify that the person has completed the corresponding requirement. At selected times during the event, the form is scanned with the electronic scanner to create a scan result, or electronic image of the form. From the scan result, the computer detects the form identifier and the mark state of each response field in each person's set of response fields. In this regard, the mark state is either marked or unmarked. The form identifier and the mark state of each response field in each person's set of response fields are stored so that the stored mark states indicate the fulfillment status of requirements for completing the objective by the respective person.

The invention may further determine programmatically whether a person has completed the objective based on the response field mark states. In this regard, a completion schema is defined by identifying at least one response field common to each set of response fields in use on the form whose mark state signifies the completion status of the objective. The computer then accesses the stored mark state of each response field correspondingly identified in the completion schema to thereby determine the completion status of the objective for the respective person.

The present invention provides alternatives for defining the completion schema. In one alternative, the completion schema is defined as a predesignated response field that, when marked, signifies completion of the objective and, when not marked, signifies lack of completion of the objective.

In another alternative, the completion schema is defined as a first predesignated response field that, when marked, signifies completion of the objective and a second predesignated response field that, when marked, signifies lack of completion of the objective. In this way, upon the conclusion of class or other event, the counselor can affirmatively indicate whether a person completed, or did not complete, the objective and thereby better ensure completed records.

In a further alternative, the completion schema is defined as a combination of response fields, each containing the fulfillment status of an individual requirement for completing the objective, that, when each response field in the combination is in the marked state, signifies completion of the objective.

Additional advantages and novel features of the invention will be set forth in the description which follows, and in part will be apparent to those skilled in the art upon examination of the following, or may be learned by practice of the invention.

BRIEF DESCRIPTION OF THE DRAWINGS

The present invention is described in detail below with reference to the attached drawing figures, wherein:

FIG. 1 shows an excerpt of a computer-readable form useable with an exemplary method in accordance with the present invention;

FIG. 6 shows a portion of a computer-readable form useable with the present invention, depicting a predesignated field;

FIG. 7 shows a portion of a computer-readable form useable with the present invention, depicting a first predesignated field and a second predesignated field; and FIG. 8 shows a portion of a computer-readable form useable with the present invention, depicting a combination of response fields.

DETAILED DESCRIPTION OF EXEMPLARY EMBODIMENTS

The present invention provides a computerized method for tracking the fulfillment status of requirements for completing an objective using a computer-readable form. Before a class or other event at which persons will seek to complete the requirements for the objective, a printed form is generated containing a form identifier and a separate set of response fields for each person seeking to complete the objective whose fulfillment status is maintained on the form. Response fields are marked by hand to signify a person's fulfillment of individual requirements for the objective. Periodically, the form is scanned to thereby enter into a computer the requirement fulfillment status. In addition, the present invention defines completion schema that can determine whether a person has completed the objective based on the mark state stored for at least one response field.

The present invention may be implemented using a personal computer with an operating system, such as Microsoft Windows XP. An electronic scanner capable of scanning the form is attached to the computer. In this regard, it will often be helpful for the scanner to have an automatic sheet feeder for more convenient processing of multiple forms. The method of the present invention may be implemented using a programming language, such as C++ or C# as provided in the Microsoft Visual Studio 2005 product. A software development kit providing capabilities for programmatically analyzing a scanned image is also required, such as the SmartScan Xpress software from the Pegasus Imaging Corporation, although other comparable software is commercially available and could likewise be employed.

FIG. 1 is an excerpt of a computer-readable form usable by the present invention. Form 100 can be created in a variety of layouts using a variety of software, including the Microsoft Visio software. And it may be printed on various media including white photocopy paper, waterproof tear-resistant paper, or card stock. The media must of course be compatible with the chosen electronic scanner. Similarly, the media should be sufficiently durable to withstand multiple scans without damage. Objective 102 is shown on form 100, here as the Boy Scout merit badge Citizenship in the World. In this regard, many objectives or awards offered by other organizations could be used as the present invention is not limited to the Boy Scout award context. The requirements for the specific objective or award normally are publicly available, such as via the Internet, and may be specified in a format such as shown below in Table 1:

TABLE 1

| Requirement | | Description |
| --- | --- | --- |
| 1. | | Do the following |
| | 1.a. | Text of requirement 1.a. |
| | 1.b. | Text of requirement 1.b. |
| 2. | | Text of requirement 2 |
| 3. | | Do 1 of the following: |
| | 3.a. | Text of alternative requirement 3.a. |
| | 3.b. | Text of alternative requirement 3.b. |

Objective 102 may additionally include a numeric identifier for ease of reference, such as the number "3741" illustrated as part of objective name 102.

Form 100 is also supplied with a unique, computer-readable identifier, such as form identifier 119. Although form identifier 119 is shown as an alphanumeric string, a bar code or other designation could likewise be used. Participant identifiers 104, 106, and 108 are supplied on the form indicating the persons seeking to complete the objective. FIG. 1 illustrates the use of names as participant identifiers, but other designations, such as numbers or initials, could be employed. Including the names on the form is usually for the convenience of the event leader, as the names on the form could, but normally need not, be programmatically extracted from the image of the form following scanning. The names of the persons seeking to complete the objective could be obtained in various ways, such as by offering an on-line registration capability so that the participant information can be provided in electronic form directly by the participants. Moreover, additional participant identifiers could be shown on form 100 up to its space capacity.

Response fields, such as response fields 112, 114, and 116, are printed on form 100. A response field is a location on the form whose mark state can signify the fulfillment status of a requirement or the completion status of the objective. The response field should be adapted to receive a manually supplied mark, such as made with a pencil, or other indicator detectable by a scanner. As supplied on the form, a response field can be depicted as a hollow shape, lightly colored on the form so as not to appear in the scanned image following a black-and-white scan. The shape may be circular, rectangular, or other configuration. Multiple response fields are spaced evenly in a horizontal row on form 100, although rows of response fields could be oriented vertically or in another desired configuration.

The response fields on form 100 are organized in rows so that row numbers 110 may also be supplied on the form for clarity adjacent participant identifiers 104, 106, and 108. For example, response fields 116 are shown in a horizontal row, such that the row of response fields beginning with response field 112 and extending rightwards on form 100 to response field 114 constitutes a set of response fields containing the requirement fulfillment status for participant 110. This set of response fields thus is distinguishable from other response fields in the row that, for a given objective, may remain unused, such as those illustrated here as response fields 115. Form 100 can be supplied with multiple rows of response fields aligned to form a grid of rows and columns for ease of use.

Objective 102 has multiple requirements that must be fulfilled to complete the objective. Accordingly, form 100 is also provided with requirement indicators 120, here identifying the requirement numbers currently published by the Boy Scouts of America for the Citizenship in the World merit badge referenced in objective 102. Corresponding requirement indicators could be supplied for objectives from other organizations as well. In addition, the requirement indicators shown on form 100 could comprise a short textual description of the corresponding requirement with or without an accompanying number. Since the rows of response fields are normally aligned to form columns, a row of requirement indicators can be positioned atop the first row of response fields with one such indicator shown for each requirement. The presence of such an indicator identifies the response fields in a given column, if in a set of response fields assigned to a person, as belonging to the set of response fields containing the requirement fulfillment status for the person shown on the form or otherwise can signify the completion status of the objective for the person. Thus, for example, response field 112 is in a column with requirement indicator 121 at the top of the column. Response field 112 is thus within the set of response fields for the person referenced by participant identifier 108 and contains the completion status of requirement 1a for that person. Of course, a requirement indicator primarily provides clarity when filling in the response fields in a given set, and a response field could belong to a set even if no requirement indicator is printed atop the respective column.

The form may have a uniform format so that the number of responses fields in a set may exceed the number of actual requirements, leaving some response fields in a row unused. Response fields not in use may be left unlabeled or labeled with "n/a" or similar legend atop the corresponding column. Form 100 may be further supplied with registration marks 118 in a specified location that can be detected from the scan result to verify that form 100 was properly aligned during scanning.

Figure 2:
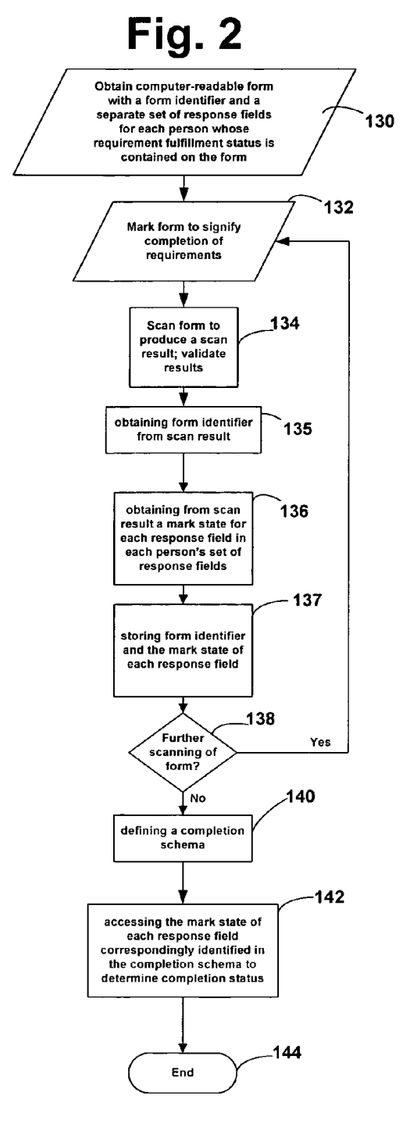
FIG. 2 is a flowchart providing an overview of an exemplary method in accordance with the present invention.

FIG. 2 is a flow chart illustrating the processing according to an exemplary method of the present invention, described in use in conjunction with the form 100 of FIG. 1. As shown at step 130, form 100 is provided with a separate set of response fields for each person whose requirement fulfillment status is contained on the form. Form 100 may be able to contain 20 or more rows, each row containing a separate set of response fields. Thus, a standard form may contain more rows of response fields than there are participants in a given event. Conversely, multiple forms may be required to record the completion status of an objective if the number of participants in the event exceeds the capacity of one form.

At step 132, response fields on form 100 are marked, such as with a pencil, to signify a person's fulfillment of the corresponding requirement. At step 134, the form is scanned using an electronic scanner, such as a scanner manufactured by the Hewlett Packard company, to produce a scan result. The scan result can be an image of form 100 stored in the well-known Tag Image File Format, or TIFF, although other image formats compatible with the programming software could be employed. As will be understood by those skilled in the art, it may be advantageous to perform certain validation checks on the scan results, such as verifying that registration marks 118 are in the proper location within the scanned image.

At step 135, the computer detects form identifier 119 from the scan result using the software noted above, such as using optical character recognition (OCR) routines. At step 136, the computer detects from the scan result the mark state of each response field in each person's set of response fields. Additionally, in obtaining the mark state of each response field in a set, the mark state of each response field, even those shown on the form but not contained within the set, could be obtained for ease of processing. OCR, optical mark reader (OMR), and similar programming capabilities in, for example, the Pegasus SmartScan software referenced above, may be utilized to extract from the scan result form identifier 119 and the mark states of the response fields in the set.

At step 137, form identifier 119 is stored, such as on the computer, in alphanumeric format along with the mark state of each response field in each person's set of response fields so that the stored mark states indicate the fulfillment status of requirements for completion of the objective by the respective person. Various approaches to storing the mark states could be employed. For example, the mark states could be stored as Boolean values in database tables using the Microsoft Access or Microsoft SQL database software. One such table could be as shown below in Table 2.

TABLE 2

| FormID | Objective ID | Participant ID | Row# | C01 | C02 | C03 |
|---|---|---|---|---|---|---|
| 2007-123-4567-890 | 3741 | Doe01, John | 1 | TRUE | FALSE | TRUE |
| 2007-123-4567-890 | 3741 | Doe02, John | 2 | FALSE | TRUE | TRUE |
| 2007-123-4567-890 | 3741 | Doe03, John | 3 | TRUE | FALSE | FALSE |

In this example, Table 2 contains, for the form identifier in the "FormID" column here shown as "2007-123-4567-890," the stored mark state for each person shown on a form, such as form 100, after it has been marked. Form identifier 119 thus enables the form and its corresponding mark states to be identified from among many forms being scanned for multiple objectives. The specific objective is identified numerically in the "Objective ID" field, here as "3741." The Objective ID field thus identifies the award whose completion status is contained on the corresponding FormID. Similarly, the "Participant ID" field contains a participant identifier shown on the form corresponding to FormID for a given person, and the "Row#" field indicates the row on that form containing the set of response fields corresponding to the respective Participant ID. These fields could be initially populated based on the data obtained, for example, during an online registration process for the corresponding award. Table 2 could also be used as a cross-reference to programmatically determine the row on a given form, and thus the set of response fields in that row, corresponding to a particular participant identifier.

For ease of display, Table 2 illustrates the stored mark state for only columns 1, 2, and 3 on the form, which are each fields extracted from columns 1, 2, and 3 on the form, signified as respectively as table columns C01, C02, and C03. A separate column in the table corresponding to each column of response fields on the form would normally be supplied. In this example, a "TRUE" condition in field C01, C02, or C03 signifies that the response field in the respective column on the form was in the marked state for the specified participant.

To indicate which columns on form 100 correspond to which requirements for completing the objective, Table 2 could be linked in a relational database to another table, such as shown below in Table 3, on the "Objective ID" field.

TABLE 3

| Objective ID | R01 | R02 | R03 |
|---|---|---|---|
| 3741 | 1a | 1b | 2a |

In this way, the tables present one approach to storing the mark state of each response field to indicate the fulfillment status of the respective requirement. In the above example for the objective numbered 3741 and for a given person, the mark state of column C01 indicates the fulfillment status of requirement 1a as shown in column R01 in Table 2, the mark state of column C02 indicates the fulfillment status of requirement 1b as shown in column R02, and the mark state of column C03 indicates the fulfillment status of requirement 2a as shown in column R03.

The form may be scanned multiple times before the event ends, and thus at step 138, control can return to step 132 for further desired processing as described above. In this regard, if a response field were marked incorrectly when scanned, a correction could be made on the form so that when next scanned, the corrected mark state would be stored. Alternatively, step 138 could be omitted, such that the completion status of the objective could be determined at steps 140 and 142 (as described below) after each scan, or other desired processing.

If no further scanning is to be performed as determined at step 138, then control passes to step 140 where a completion schema is defined by identifying at least one response field common to each set of response fields in use on the form whose mark state signifies the completion status of the objective. Thus, for example, the completion schema could be defined as a specified column on form 100 that, when in the marked state, signifies completion of the objective for the respective person. Processing the completion schema could be implemented in a variety of ways, such as with an IF-THEN-ELSE statement or a database table. In this regard, a response field is in use on the form if contained in a set of response fields assigned to a person whose requirement fulfillment status is contained on the form.

At step 142, the stored mark state of each response field correspondingly identified in the completion schema is accessed to thereby determine the completion status of the objective for the respective person. For example, if fulfillment of requirements 1, 2, and 3 completed the objective, the completion schema would identify the response fields containing the fulfillment status for these requirements, such as columns 1, 2, and 3. In this way, based on the results of comparing the stored mark states with the completion schema, the completion status of the objective can be determined. Processing then ends at step 144.

Figure 3:
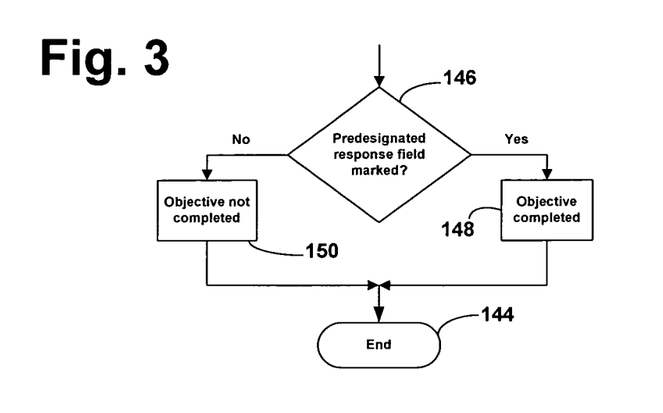
FIG. 3 is a flowchart illustrating the processing of a completion schema.

Alternatively, the completion schema may be further defined as a predesignated response field that, when marked, signifies completion of the objective and, when not marked, signifies lack of completion of the objective. FIG. 3 illustrates one manner of processing a completion schema defined in this manner. In this regard, after defining this completion schema, control passes from step 140 in FIG. 2 to step 146 in FIG. 3. Form 190 in FIG. 6 would be useable with the invention in this respect. The mark state of a predesignated response field 192 on form 190 indicates whether the participant has completed the requirements for the objective. Regardless of the requirements marked in the other response fields on form 190, when response field 192 is in the marked state, the objective is signified as completed by the corresponding participant. Thus, at step 146, the mark state of predesignated response field 192 is determined. If predesignated response field 192 is marked, then at step 146 control passes to step 148 and the objective is deemed completed. In contrast, if at step 146, predesignated response field 192 is in the unmarked state, control passes to step 150, and the objective is deemed not completed. Processing then ends at step 144.

Alternatively, a completion schema may be defined at step 140 in FIG. 2 to provide additional confirmation of a participant's final completion status. In this regard, the completion schema would define a first predesignated response field that, when marked, signifies completion of the objective and a second predesignated response field that, when marked, signifies lack of completion of the objective.

Figure 4:
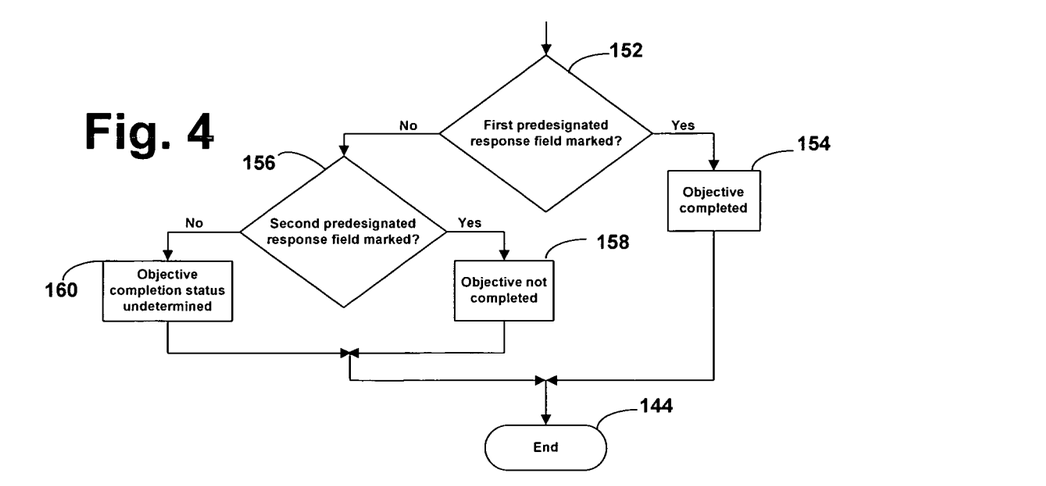
FIG. 4 is a flowchart illustrating the processing of another completion schema.

The processing of such a completion schema is illustrated in FIG. 4. The processing shown in FIG. 4 contemplates a modified version of form 100, such as form 194, as shown in FIG. 7. Form 194 additionally contains a first predesignated response field 196 and a second predesignated response field 198. In this regard, the order of the predesignated fields is not critical. Response field 198 could well be the first predesignated response field and response field 196 could be the second predesignated field. Thus, control passes from step 140 in FIG. 2 to step 152 in FIG. 4, and the mark state of the first predesignated response field 196 is ascertained for the person. If at step 152, the first predesignated response field is in the marked state, control passes to step 154 where the objective is deemed completed and processing ends when control passes to step 144, If on the other hand, at step 152, first predesignated response field 196 is in the unmarked state, control passes to step 156. The mark state of second predesignated response field 198 is then ascertained. If second predesignated response field 198 is in the marked state, control then passes to step 158, and the objective is deemed not completed. If on the other hand at step 156 the second predesignated response field is in the unmarked state, control passes to step 160, and the objective completion status is then deemed as not yet finally determined. Control then passes to step 144 where processing ends.

In a further alternative, the completion schema could be defined at step 140 as a combination of response fields, each containing the fulfillment status of a requirement for completing the objective, that, when each response field in the combination is in the marked state, signifies completion of the objective. This completion schema could be implemented using a form such as form 200 in FIG. 8, which is an excerpted version of form 100 in FIG. 1. The response fields 202 in form 200 have been marked to indicate the fulfillment status of the requirements for the objective showing a combination of marked response fields indicating that all necessary requirements have been fulfilled.

As noted above, an objective may have requirements that are fulfilled by completing one or more from a group of alternative steps. For example, requirement 3 for a given objective could be fulfilled by completing 1 of 2 alternative steps. In this regard, a completion schema could be implemented as a database table specifying the response fields, or columns on the form, representing alternative requirements. One example is shown in Table 4 below. In that table, the "ObjectiveID" column contains the number associated with the objective, such as 3741. The "Column" field specifies the column on form 100 containing each response field in a set, numbered consecutively from left to right. For ease of reference, the requirement indicators are shown in the column marked "Requirement," although such indicators would not necessarily be required in this table. The "GroupNum" column signifies which requirements have alternatives and, if so, the group of alternatives to which the specific alternative belongs. Thus, in this example, if a zero is shown in the GroupNum column, the requirement in the "Requirement" column has no alternatives and must itself be fulfilled to complete the objective. Any other number shown in the GroupNum column indicates that rows in Table 4 with the same GroupNum are alternatives within the same group of alternatives. The "Do" column indicates how many of the alternatives in the group of the alternative requirements must be completed, and the "of" column indicates the total number of alternatives in the group, as in "Do 1 of 2" alternative requirements.

TABLE 4

| ObjectiveID | Column | Requirement | GroupNum | Do | of |
|---|---|---|---|---|---|
| 3741 | 1 | 1a | 0 | | |
| 3741 | 2 | 1b | 0 | | |
| 3741 | 3 | 2a | 0 | | |
| 3741 | 4 | 2b | 0 | | |
| 3741 | 5 | 3a | 3 | 1 | 2 |
| 3741 | 6 | 3b | 3 | 1 | 2 |
| 3741 | 7 | 4a | 0 | | |
| 3741 | 8 | 4b | 0 | | |
| 3741 | 9 | 5a | 0 | | |
| 3741 | 10 | 5b1 | 5b | 2 | 7 |
| 3741 | 11 | 5b2 | 5b | 2 | 7 |
| 3741 | 12 | 5b3 | 5b | 2 | 7 |
| 3741 | 13 | 5b4 | 5b | 2 | 7 |
| 3741 | 14 | 5b5 | 5b | 2 | 7 |
| 3741 | 15 | 5b6 | 5b | 2 | 7 |
| 3741 | 16 | 5b7 | 5b | 2 | 7 |

Thus, requirements 3a and 3b in Table 4 are shown as alternative requirements, each having a GroupNum of 3. To complete the objective, the person must complete one of these two requirements, as indicated with a value of "1" in the "Do" column and a value of "2" in the "of" column. Table 4 could define multiple combinations of response fields that, when each is the marked state, signify completion of the objective. For example, if the Table 4 contained all of the possible requirements for the objective, one completion schema could be defined as the following columns in Table 5:

TABLE 5

| | | | | Requirement: | | | | | |
|---|---|---|---|---|---|---|---|---|---|
| 1a | 1b | 2a | 2b | 3a | 4a | 4b | 5a | 5b2 | 5b4 |
| Column: 1 | 2 | 3 | 4 | 5 | 7 | 8 | 9 | 11 | 13 |

This completion schema identifies one set of requirements and corresponding columns in the table for storing the mark states of response fields in a set that, when marked, signify completion of the objective. Here, the completion schema signifies completion of the objective if the person completes requirements 1a, 1b, 2a, 2b, 3a, 4a, 4b, 5b2, and 5b4, which are the response fields in the set of response fields found at columns 1, 2, 3, 4, 5, 7, 8, 9, 11, and 13 on the corresponding form and database table.

Figure 5:
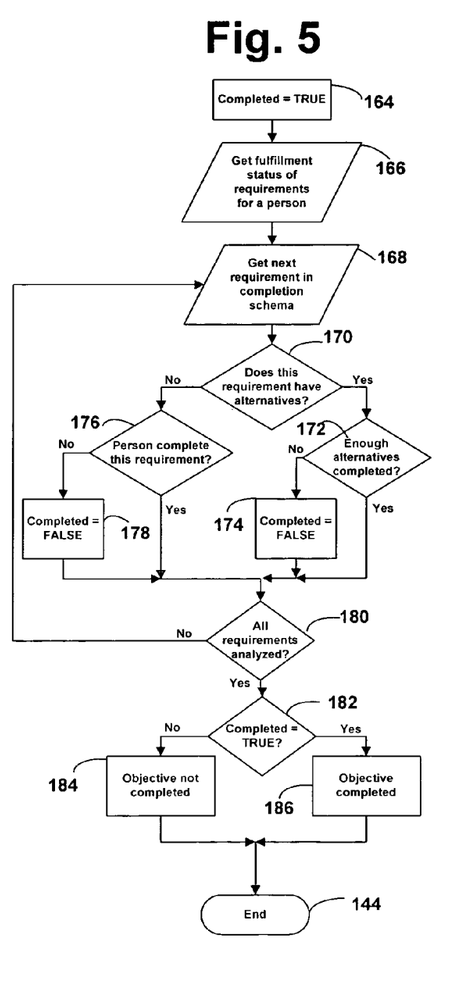
FIG. 5 is a flowchart illustrating the processing of a further completion schema.

As will be understood by those skilled in the art, various approaches to implementing such a completion schema could be implemented so as to determine the fulfillment status of individual requirements for completing an objective. FIG. 5 illustrates a method for processing such a completion schema.

Control passes from step 140 in FIG. 2 to step 164 in FIG. 5. A Boolean variable "Completed" is initialized to the "True" value as a flag eventually signifying whether the person completed the objective. At step 166, the method obtains the fulfillment status of requirements for a person from the set of response fields for that person, for example as previously identified at step 136. The columns in a given set specified in the completion schema are then examined. The next requirement in the completion schema is obtained at step 168. Control then passes to step 170 to determine whether the requirement has any alternatives. If so, control passes to step 172 to analyze all alternative requirements to determine whether the necessary number of alternatives have been completed so that the necessary requirement has been fulfilled. If not, control passes to step 174, and the Completed flag is set to False, signifying the objective has not been completed. If so, control passes to step 180 to determine whether all requirements have been analyzed as specified in the completion schema. If not, control returns to step 168, and processing continues. If at step 180 the fulfillment status of all requirements has been analyzed, control passes to step 182, and the Completed flag is examined. If the flag is still set to True, control passes to step 182, and the objective is deemed completed for this person at step 186. If the flag is set to False, control passes to step 184, and the objective is deemed not completed for this person. Control then passes to step 144 and ends.

If on the other hand at step 170, the requirement has no alternatives, control passes from step 170 to step 176, and the mark state of the field specified in the completion schema is correspondingly evaluated in the person's set of response fields. If the corresponding field in the database table is shown as marked, control passes to step 180 and proceeds as described above. If on the other hand, the corresponding field in the database table is shown as not marked, then control passes to step 178, and the Completed flag is set to False. Control then passes to step 180 and continues as described above.

The above example describes one way of defining a completion schema to identify a combination of response fields whose mark states signify fulfillment of the requirements to complete the objective. As will be appreciated by those skilled in the art, other methodologies could be employed in this regard.

From the foregoing, the invention can be seen to offer improved recordkeeping concerning participants' progress towards completing an objective by providing time and cost savings without a conspicuous display of technology to the participants. In this regard, the present invention is not limited to awards of particular organizations, but could also be used in connection with any objective whose requirements are being tracked for completion. Other examples could include school groups, corporate team building, or any other event where tracking the fulfillment of requirements toward completing an objective using manual input into a PC may be impractical or difficult.

Alternative embodiments of the present invention may become apparent to those skilled in the art to which it pertains upon review of the specification, including the drawing figures. The various methodology and forms shown in FIGS. 1-8 and described in the specification are merely exemplary of those suitable for use in connection with the present invention. Accordingly, the scope of the present invention is defined by the appended claims rather than the foregoing description.

What is claimed and desired to be secured by Letters Patent is as follows:

1. Within a youth scouting organization, a computerized method for processing a multi-person paper award form containing thereon a form identifier to obtain an individual award completion status for each of at least two persons whose requirement fulfillment status toward individual completion of the award is contained on the form in a respective separate and identical set of response fields printed on the form, comprising:
- scanning the multi-person paper award form using an electronic scanner to produce a scan result, wherein each said separate and identical set of response fields printed on the form contains a corresponding response field for recording the fulfillment status of each of the requirements toward individual completion of the award by each said at least two persons, respectively;
- obtaining the form identifier contained on the form from the scan result;
- obtaining from the scan result a mark state for each response field printed on the form in said each of at least two persons' respective said separate and identical set of response fields;
- validating the fulfillment status of requirements for said each of at least two persons based on the mark state for each response field in said each of at least two persons' respective said separate and identical set of response fields;
- obtaining from a database an individual form row number for said each of at least two persons, wherein the form row number identifies the respective row number of the separate and identical set of response fields for said each of at least two persons contained on the multi-person paper award form having the form identifier obtained from the scan result;
- storing the form identifier and the mark state of each response field in said each of at least two persons' said separate and identical set of response fields with the respective individual form row number so that the stored mark states indicate the fulfillment status of requirements for individual completion of the award by said each of at least two persons; and comparing the stored mark states for said each of at least two persons contained on the multi-person paper award form with a completion schema to obtain the resulting individual award completion status for said each of at least two persons.

2. The method of claim 1, wherein said completion schema comprises:
- identifying at least one response field common to each said separate and identical set of response fields, the mark state of which response field signifies the completion status of the award; and
- accessing the stored mark state of each response field correspondingly identified in the completion schema to thereby determine the completion status of the award for the respective person.

3. The method of claim 2, wherein the completion schema is defined as a predesignated response field that, when marked, signifies completion of the award and, when not marked, signifies lack of completion of the award.

4. The method of claim 2, wherein the completion schema is defined as a first predesignated response field that, when marked, signifies completion of the award and a second predesignated response field that, when marked, signifies lack of completion of the award.

5. The method of claim 2, wherein the completion schema is defined as a combination of response fields, each containing the fulfillment status of a requirement for completing the award, that, when each response field in the combination is in the marked state, signifies completion of the award.

6. A non-transitory computer-readable medium having computer-executable instructions for processing a multi-person paper award form containing thereon a form identifier to obtain an individual award completion status for each of at least two persons whose requirement fulfillment status toward individual completion of the award is contained on the form in a respective separate and identical set of response fields printed on the form, said method comprising:
- scanning the multi-person paper award form using an electronic scanner to produce a scan result, wherein each said separate and identical set of response fields printed on the form contains a corresponding response field for recording the fulfillment status of each of the requirements toward individual completion of the award by each said at least two persons, respectively;
- obtaining said form identifier contained on the form from the scan result;
- obtaining from the scan result a mark state for each response field printed on the form in said each of at least two persons' respective said separate and identical set of response fields;
- validating the fulfillment status of requirements for said each of at least two persons based on said the mark state for each response field in said each of at least two persons' respective said separate and identical set of response fields;
- obtaining from a database an individual form row number for said each of at least two persons, wherein the form row number identifies the respective row number of the separate and identical set of response fields for said each of at least two persons contained on the multi-person paper award form having the form identifier obtained from the scan result;

storing the form identifier and the mark state of each response field in said each of at least two persons' said separate and identical set of response fields with the respective individual form row number so that the stored mark states indicate the fulfillment status of requirements for completing the award by said each of at least two persons; and
- comparing the stored mark states for said each of at least two persons contained on the multi-person paper award form with a completion schema to obtain the resulting individual award completion status for said each of at least two persons.

7. The non-transitory computer-readable medium of claim 6, wherein said completion schema comprises:
- identifying at least one response field common to each said separate and identical set of response fields, the mark state of which said response field signifies the completion status of said award; and
- accessing said stored mark state of each said response field correspondingly identified in said completion schema to thereby determine the completion status of the award for the respective person.

8. The non-transitory computer-readable medium of claim 7, wherein the completion schema is defined as a predesignated response field that, when marked, signifies completion of the award and, when not marked, signifies lack of completion of the award.

9. The non-transitory computer-readable medium of claim 7, wherein said the completion schema is defined as a first predesignated response field that, when marked, signifies completion of the award and a second predesignated response field that, when marked, signifies lack of completion of the award.

10. The non-transitory computer-readable medium of claim 7, wherein the completion schema is defined as a combination of response fields, each containing the fulfillment status of a requirement for completing the award, that, when each said response field in the combination is in the marked state, signifies completion of the award.

* * * * *